(No Model.)
R. McGAHEY.
MOWER.
No. 519,197.　　　　　　　　　　Patented May 1, 1894.
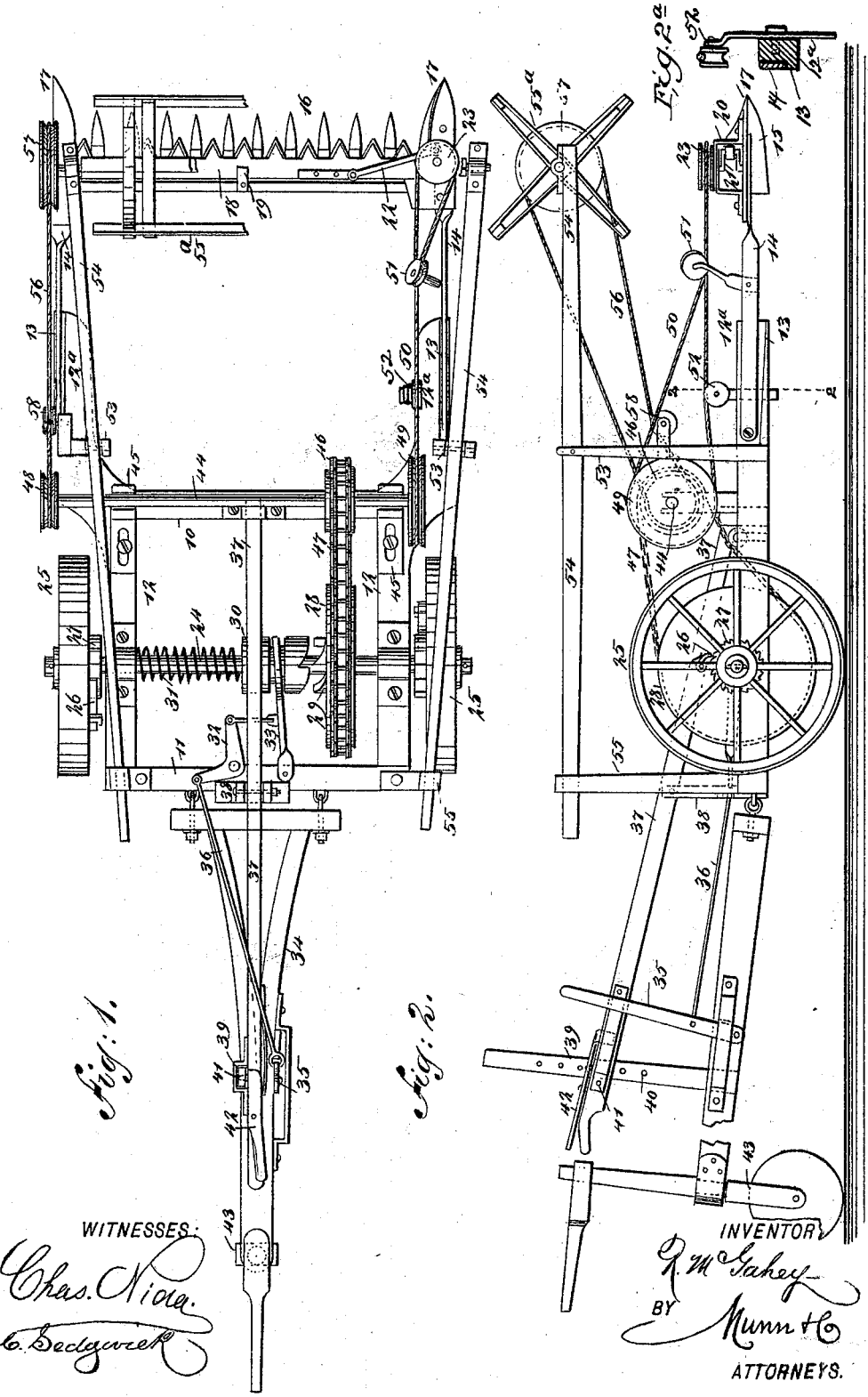
WITNESSES:
Chas. Niola
C. Sedgwick
INVENTOR
R. McGahey
BY
Munn & Co
ATTORNEYS.

UNITED STATES PATENT OFFICE.

RICHARD McGAHEY, OF WALLA WALLA, WASHINGTON.

MOWER.

SPECIFICATION forming part of Letters Patent No. 519,197, dated May 1, 1894.

Application filed May 19, 1893. Serial No. 474,768. (No model.)

*To all whom it may concern:*

Be it known that I, RICHARD McGAHEY, of Walla Walla, in the county of Walla Walla and State of Washington, have invented a new and Improved Mower, of which the following is a full, clear, and exact description.

This invention is an improvement in mowing machines having the finger-bar and sickle, or cutter, located at the front, ahead of the team.

The invention consists in the novel construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1 is a plan view of the machine, the reel being partly broken away; and Fig. 2 is a side elevation of the machine. Fig. 2ª is a detail cross section on line 2—2 of Fig. 2.

In carrying out the invention the frame of the machine usually consists of a front bar 10, a rear bar 11, and side bars 12, the said side bars being connected with the front and rear bars in any suitable or approved manner. The side bars extend forwardly beyond the front bar 10 of the frame, and the inner faces of the extensions 12ª of the side bars are so cut or shaped that the space between them will be much greater than the space between the inner faces of the main side bars of the frame. In the outer faces of the side frame extensions 12ª, longitudinal recesses 13, are cut, and in the rear portions of each of these recesses the rear end of a bar 14, is pivoted, the bar being capable of unlimited upward movement at its forward end since the upper portion of the recess is open; but the bars 14, are limited as to their downward movement by reason of coming in engagement with the base walls of the said recesses. The bars 14, are firmly attached in any suitable or approved manner to the ends of a finger bar 15. The said finger bar is provided with the usual fingers 16, and at each of its ends is provided with a shoe 17. The shoe at the right-hand side of the machine is much larger than that at the left-hand side, as is illustrated in Fig. 1, since at this end of the finger bar the driving mechanism of the sickle 18, is located.

The sickle has sliding or end movement upon the finger bar, the said bar being channeled to receive the sickle; and the sickle is held in place by projecting straps 19 from the rear upper portion of the finger bar over the sickle. These straps are secured to the finger bar by means of thumb screws or equivalent fastening devices. A housing 20 is erected upon the finger bar at the rear of its right-hand shoe, and in this housing a crank shaft 21, is journaled, as shown in Fig. 2, and the crank arm of the shaft has connected with it a pitman 22, which pitman has pivotal connection with the sickle, as illustrated in Fig. 1. The upper end of the crank shaft is provided with a pulley 23, and the pulley may be covered in such manner as to protect it from the cut hay. The finger bar is pivotally connected with the frame in the manner above described in order that it may rise automatically to surmount any obstruction that may be in its path. An axle 24, is pivoted in the body portion of the frame, and the axle is mounted to turn loosely in suitable bearings. Upon the ends of the axle, supporting wheels 25, are loosely mounted. These wheels are likewise drive wheels, since they are provided with dogs 26, held normally in engagement with ratchet wheels 27, secured upon the axle, the dogs being usually spring-pressed. When the machine is pushed forward the dogs so engage with the ratchet wheels as to revolve the axle, but when the machine is drawn rearwardly or back the dogs slip over the ratchet wheels and have no action upon them. A driving pulley 28, preferably a chain-pulley, is loosely mounted upon the axle, and the said pulley is provided with a clutch face 29, adapted for engagement with a clutch 30, which has sliding movement upon the axle yet turns with it. The clutch is normally held in engagement with the clutch face of the driving pulley by means of a spring 31, coiled around the axle and bearing against the clutch, or the equivalent of said spring may be employed. The clutch is thrown out of engagement with the driving pulley through the medium of a lever 32. The lever ordinarily employed is an elbow lever, and is fulcrumed upon the rear of the frame; and it is connected by a link with a shifting bar 33, said bar being pivoted upon the frame and having a grip upon the clutch, as shown likewise in Fig. 1. The pole 34, is connected with the central rear portion of the frame of the machine by means of eyes, staples, or in any other approved manner, and the horses are adapted to be placed one at each side of the pole facing the machine. A lever 35, is located upon one side of the pole, connected by a link 36, or its equivalent with the elbow lever 32, operating the clutch. The forward end of the machine may be raised and lowered through the medium of a lift lever 37, which lever at its forward end is secured to the forward central portion of the frame of the machine, and the lever is fulcrumed in a standard 38, projected upward from the central rear portion of the frame. The lift lever extends rearwardly some distance over the pole, and has locking and adjustable connection with an upright 39, attached to one side of the pole. The upright is provided with a series of apertures 40, longitudinally produced therein, and the lift lever is provided with a swing-controlled pin 41, adapted to enter any one of the recesses in the upright, and the pin is released from engagement with the upright through the medium of a thumb lever 42, carried by the handle end of the lift lever. Thus, in operation, when the lift lever is elevated the forward end or sickle portion of the machine is lowered, and the sickle end is raised when the handle end of the lift lever is depressed. At the free end of the pole a caster wheel 43, is located, adapted for use as a steering wheel, since its shank is held to turn in a socket produced in the pole, and is provided at its upper end with a handle. The shifting lever 35, the lift lever 37 and the handle of the caster wheel are all readily accessible to the driver, who may be provided with a seat supported upon the rear end of the pole. A driven shaft 44, is journaled in bearings 45, over the front bar of the body of the machine frame, and the shaft 44, is parallel with the axle 24; the driven shaft 44, is provided with a pulley 46, smaller than the driving pulley 28, and the two pulleys are preferably connected by a chain belt 47. The bearings of the shaft 44, are made adjustable in order that the slack of the chain belt may be taken up when required. The shaft 44 is preferably provided at its left-hand end with a pulley 48, while a larger pulley 49, is secured upon the right-hand end of the shaft, and the pulley 49, is connected by a belt 50 preferably of rope or cable, with the pulley 23 on the driving crank shaft of the sickle, the belt being passed likewise over a guide pulley 51, suitably located upon the right-hand bar 14. The guide pulley is necessary since the belt is made to extend diagonally forward on its upward stretch. The belt 50, is likewise engaged by a tightener 52, as shown in Fig. 2, the said tightener being adapted to take up the slack of the belt, and therefore it may be adjusted to or from the belt. The tightener may be spring controlled, if desired, so that it will take up the slack of the belt effectually, in the event the sickle end of the machine is raised, as would be the case in passing over a mound for example. Standards 53, are projected upward from the side extensions $12^a$ of the frame one at each side of the machine, and these standards are adapted to have arms 54 pivotally attached in their upper ends, the arms extending forward one practically over each shoe of the sickle bar, while the rear ends of the arms extend ordinarily to the rear portion of the frame and are passed through upright guides 55, which guides limit their upward movement. Upon the forward ends of the arms 54, boxes are located, in which the trunnions of a reel $55^a$, are journaled. The reel is made exceedingly light and is driven by a belt 56, which passes over the pulley 48 and likewise over a pulley 57, located upon one trunnion of the reel. The reel may be readily removed and is only necessary when working down hill or when working on very heavy grain or during windy weather. The machine will work under other conditions as effectively without as with the reel.

Different styles of pulleys may be employed than has been described and shown; likewise different belting may be used. The belt 56, is provided also with a tightener 58, as shown in Fig. 1, the tightener being used for the same purpose as the tightener of the sickle belt 50.

When a machine is constructed as above set forth the team can draw the machine with much less exertion than when attached to a side bar machine. The machine can be directed straight across the field or it may be worked along a hill side, and can be manipulated much more readily than a side bar machine. The sickles are likewise in view of the driver, and there are so few parts to the machine, and they may be made so durable, that the machine may be made not only strong but exceedingly economical. Every part of the machine necessary to be under control is completely under the control of the driver.

Having thus described my invention, I claim as new and desire to secure by Letters Patent—

1. In a mower, a finger bar and a sickle having reciprocating movement thereon, the finger bar and sickle being pivotally connected with the forward portion of the machine, extending across the front thereof in advance of the team, and a means, substantially as shown and described, for limiting the downward movement of the finger bar, its upward movement being unlimited, as and for the purpose set forth.

2. In a mower, the combination, with a frame, an axle journaled therein, supporting wheels having clutch connection with the axle, a driving shaft, a driving connection between the axle and driving shaft, and a shifting mechanism connected with the driving mechanism, of a finger bar located in the front of the machine in advance of the team and extending practically from side to side, arms pivotally connecting the finger bar with the sides of the machine, a sickle having sliding movement in the finger bar, a crank shaft carried by the finger bar, and a pitman connection between the crank shaft and the sickle, a rope belt connection between the drive shaft and the crank shaft, a reel removably supported over the finger bar, and a belt connection between the reel shaft and the drive shaft, as and for the purpose set forth.

RICHARD McGAHEY.

Witnesses:
 JOHN L. SHARPSTEIN,
 SAMUEL B. SWEENEY.